(12) United States Patent
Park et al.

(10) Patent No.: US 7,472,567 B2
(45) Date of Patent: Jan. 6, 2009

(54) DAMPER FOR WASHING MACHINE

(75) Inventors: Seung Chul Park, Kyungki-do (KR); Si Moon Jeon, Seoul (KR); Gwan Ryong Park, Seoul (KR); Jae Hyun Kim, Kyungki-do (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 10/843,424

(22) Filed: May 12, 2004

(65) Prior Publication Data

US 2004/0261469 A1    Dec. 30, 2004

(30) Foreign Application Priority Data

May 13, 2003   (KR) ................. 10-2003-0030298
Jun. 4, 2003    (KR) ................. 10-2003-0035935

(51) Int. Cl.
*D06F 37/00*    (2006.01)
*F16F 9/00*     (2006.01)

(52) U.S. Cl. ................... 68/23.1; 188/381
(58) Field of Classification Search ........... 68/23 R, 68/23.1, 23.3; 188/129, 166, 381; 267/196, 267/201, 202, 203
See application file for complete search history.

(56) References Cited

U.S. PATENT DOCUMENTS

| 6,955,248 | B2* | 10/2005 | Park et al. | 188/267 |
| 2004/0173421 | A1* | 9/2004 | Park et al. | 188/267 |
| 2004/0226321 | A1* | 11/2004 | Park et al. | 68/23.1 |
| 2005/0224303 | A1* | 10/2005 | Park et al. | 188/322.15 |

FOREIGN PATENT DOCUMENTS

| DE | 3616373 A1 | 11/1987 |
| DE | 44 20 612 C1 | 6/1995 |
| EP | 0 301 190 A1 | 2/1989 |
| EP | 0 407 755 A1 | 6/1990 |
| EP | 0 555 707 A1 | 8/1993 |
| EP | 0 702 165 A2 | 3/1996 |
| EP | 1094239 A2 * | 4/2001 |
| WO | WO-95/14130 A1 | 5/1995 |
| WO | WO-01/27375 A1 | 4/2001 |

OTHER PUBLICATIONS

Electronic translation of EP 1094239 A2.*

* cited by examiner

*Primary Examiner*—Joseph L Perrin
(74) *Attorney, Agent, or Firm*—Birch, Stewart, Kolasch & Birch, LLP (57) ABSTRACT

Disclosed herein is a damper for washing machines. The damper comprises a cylinder and a piston interactively coupled to each other in a state wherein the cylinder is connected to a tub and the piston is connected to a base, a first friction member provided around the piston for generating a frictional force when the piston moves inside the cylinder, a slider coupled to the piston inside the cylinder so as to move together with the piston if the piston moves beyond a predetermined displacement range, and a second friction member provided around the slider for generating a frictional force when the slider moves inside the cylinder. The damper configured as stated above generates different damping forces according to the vibration degrees of the tub, thereby effectively attenuating the vibration of the tub.

20 Claims, 11 Drawing Sheets

FIG. 12

DAMPER FOR WASHING MACHINE

This Non-provisional application claims priority under 35 U.S.C. § 119(a) on Patent Application No(s). 10-2003-30298 & 10-2003-35935 filed in Korea on May 13, 2003 & Jun. 4, 2003 respectively, the entire contents of which are hereby incorporated by reference.

BACKGROUND OF THE INVENTION

1. Field of the Invention

The present invention relates to a damper for washing machines, and more particularly to a damper for use in a drum type washing machine, which causes different damping forces according to the vibration degrees of a tub mounted inside the washing machine, thereby effectively attenuating the vibration of the tub.

2. Description of the Related Art

In general, a drum type washing machine comprises a drum horizontally installed therein for loading the laundry, washing water and detergent, and is adapted to perform washing of the laundry by making use of friction between the laundry and the drum as the drum is rotated by the driving force of a motor. Such a drum type washing machine almost never causes damage or entanglement of the laundry, and provides good washing effects of the same quality as if the laundry were washed by hand.

Figure 1:
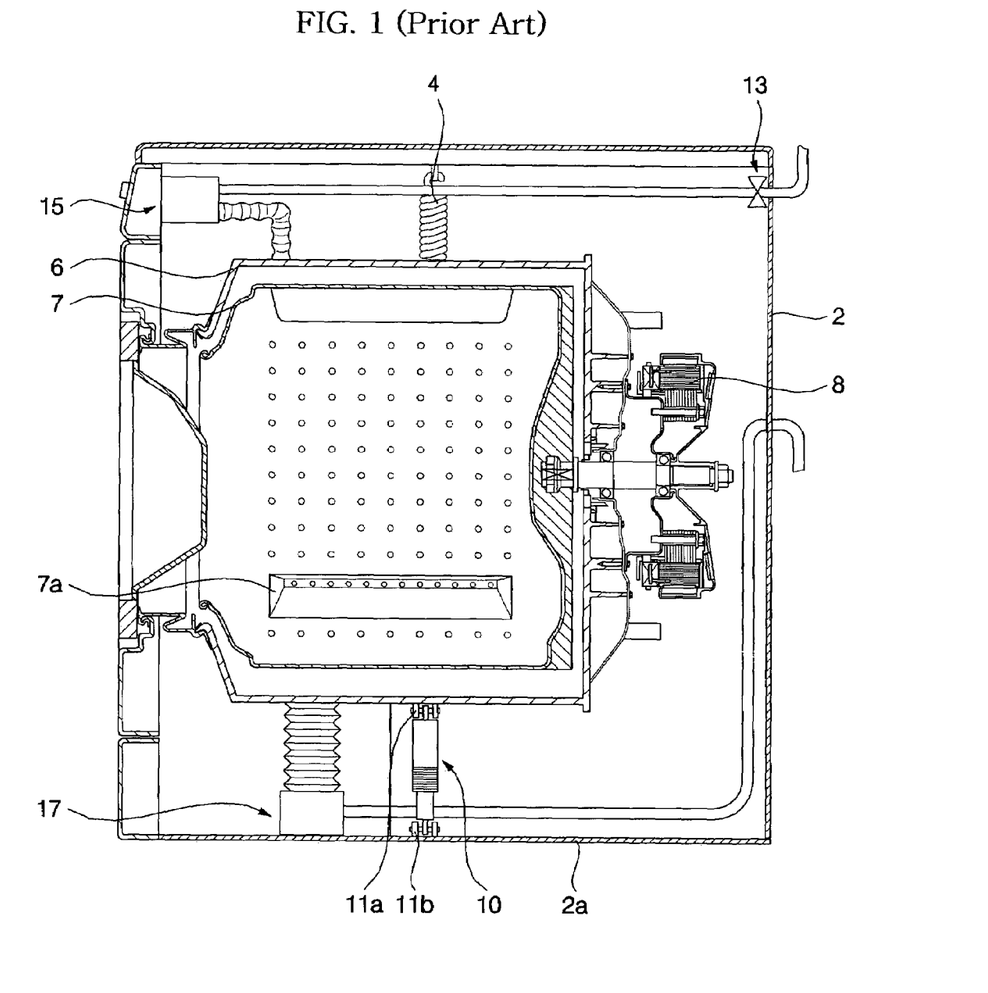
FIG. 1 is a sectional view illustrating a conventional drum type washing machine.
Figure 2:
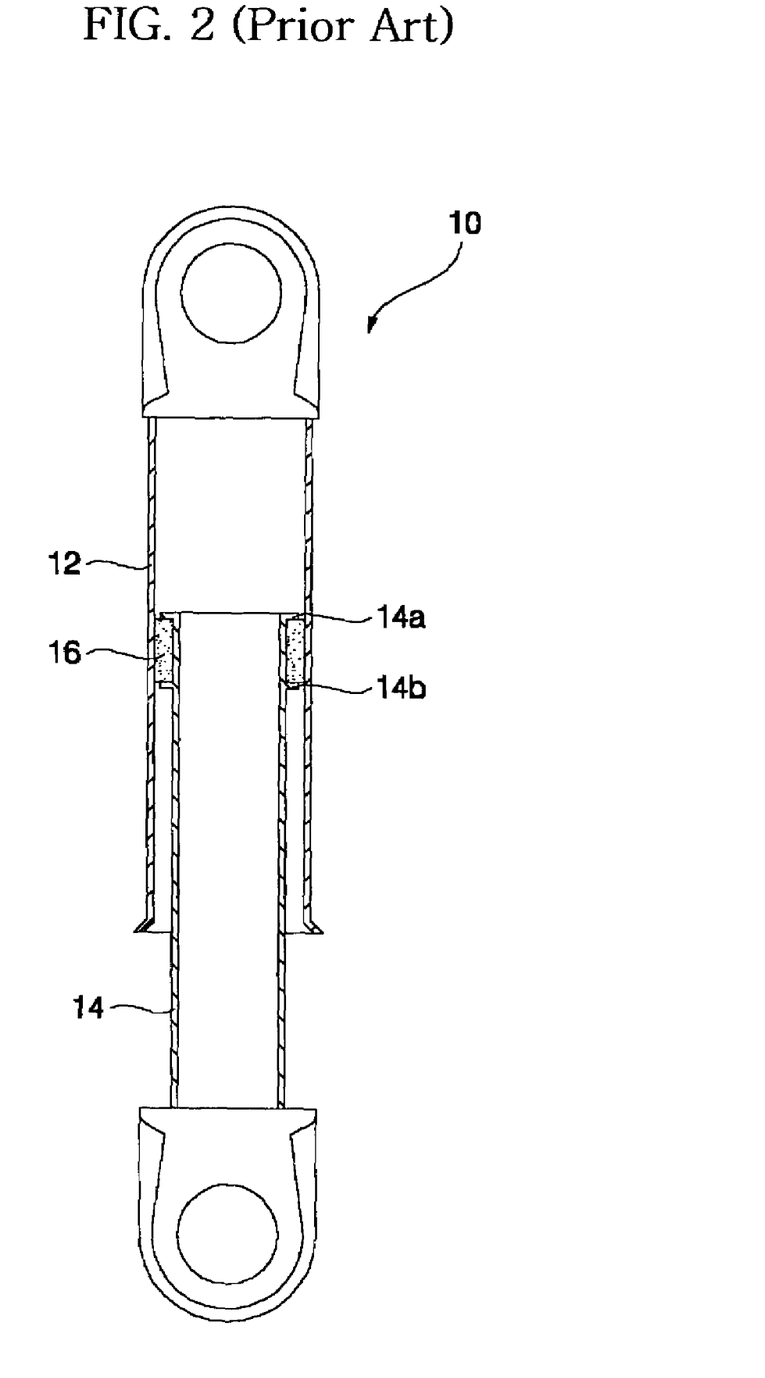
FIG. 2 is a longitudinal sectional view illustrating a conventional damper for use in the drum type washing machine shown in FIG. 1.

FIG. 1 is a sectional view illustrating a conventional drum type washing machine, and FIG. 2 is a longitudinal sectional view illustrating a conventional damper for use in the drum type washing machine as shown in FIG. 1.

As shown in FIG. 1, the drum type washing machine comprises a cabinet 2 defining the external appearance thereof, a base 2a formed as the bottom portion of the cabinet 2, a tub 6 elastically supported within the cabinet 2 by means of a spring 4 and a damper 10, a drum 7 rotatably installed inside the tub 6 and configured to accommodate the laundry and washing water for performing washing of the laundry, and a motor 8 installed behind the tub 6 so that it is connected to the drum 7 for rotating the drum 7.

Above the tub 6 there are installed a water supply valve assembly 13 and a detergent box assembly 15 for supplying the washing water and detergent into the tub 6 and the drum 7. Under the tub 6 there is installed a drainage valve assembly 17 for draining the used washing water from the tub 6 and the drum 7.

The tub 6 is installed in such a manner that the upper side portion thereof is suspended within the cabinet 2 by means of the spring 4, and the lower side portion thereof is supported at the upper side of the base 2a by means of the damper 10. With this installed configuration, the tub 6 is less affected by vibration caused as the drum 7 is rotated.

Referring to FIG. 2, the damper 10 comprises a cylinder 12 connected at the upper end thereof to the lower end of the tub 6 by means of a hinge, a piston 14 movably inserted inside the cylinder 12 and connected at the lower end thereof to the upper side of the base 2a by means of a hinge, and a friction member 16 provided around the outer peripheral surface of the piston 14 so as to come into close contact with the inner peripheral surface of the cylinder 12.

The piston 14 is formed with a pair of upper and lower stoppers 14a and 14b, which protrude radially from the outer peripheral surface thereof for supporting the friction member 16 at both upper and lower sides of the friction member 16.

The friction member 16 is configured so as to generate a constant damping force, which is set in proportion to the vibration degrees of the tub 6 estimated taking into account of the driving speed of the motor 8, and the like. By virtue of the fact that the friction member 16 is configured to generate such a constant damping force while coming into close contact with the inner peripheral surface of the cylinder 12, the friction member 16 serves to cause frictional heat energy inside the cylinder 12 when the piston 14 moves relative to the cylinder 12 due to the vibration of the tub 6, thereby acting to attenuate the vibration of the tub 6.

Figure 3:
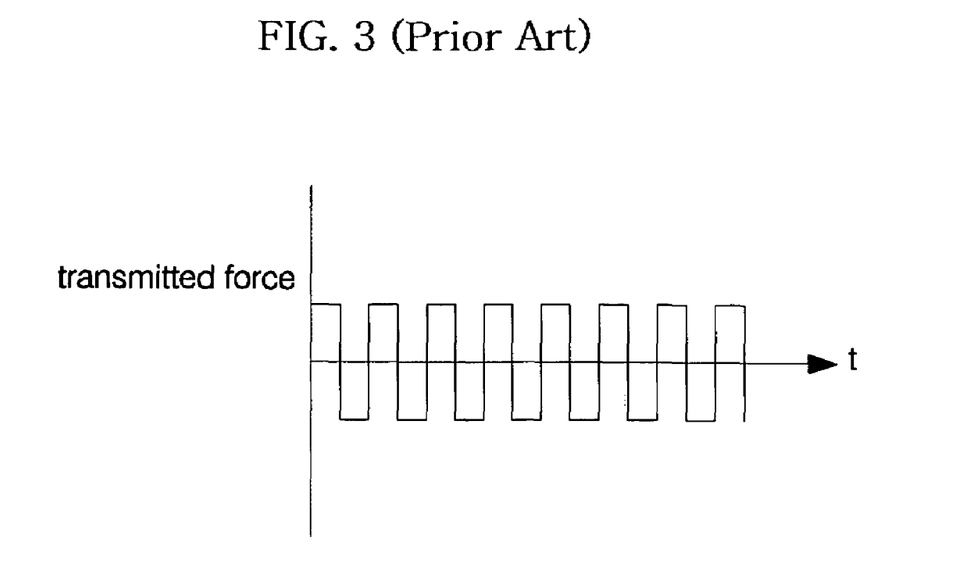
FIGS. 3 and 4 are graphs illustrating waveforms of force transmitted through the conventional damper, FIG. 3 being a graph illustrating waveforms of the transmitted force when normal vibration is applied to the damper during a dehydrating cycle, FIG. 4 being a graph illustrating waveforms of the transmitted force when excessive vibration is applied to the damper during the dehydrating cycle.
Figure 4:
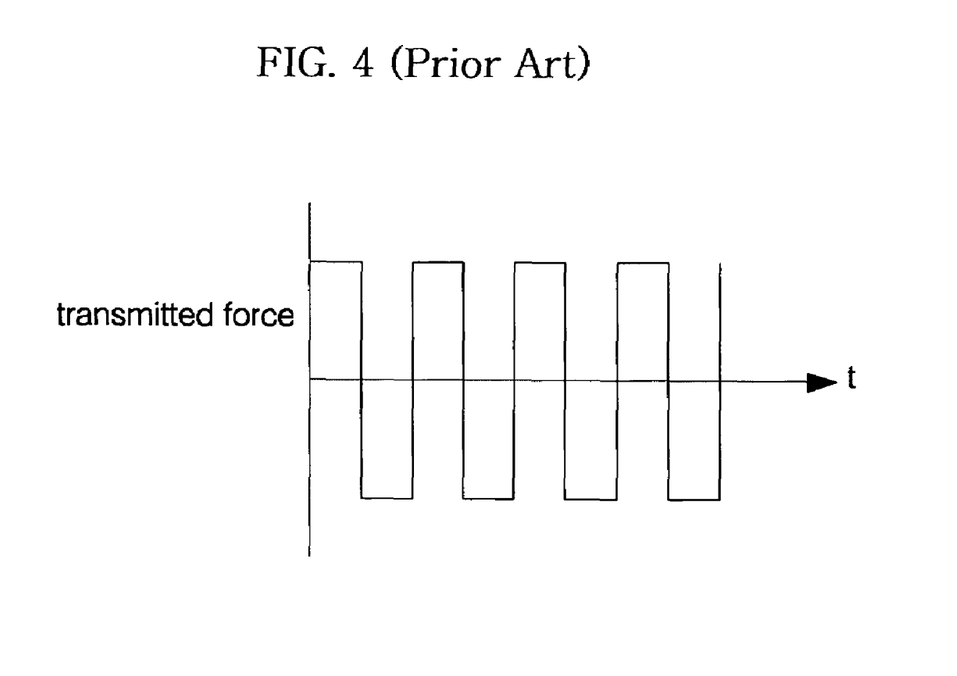

FIGS. 3 and 4 are graphs illustrating waveforms of force transmitted through the conventional damper configured as stated above. More particularly, FIG. 3 is a graph illustrating waveforms of the transmitted force when normal vibration is applied to the damper during a dehydrating cycle, and FIG. 4 is a graph illustrating waveforms of the transmitted force when excessive vibration is applied to the damper during the dehydrating cycle.

The function of the damper realizes an attenuation in the transmission of vibration force by virtue of its frictional force. With the use of the conventional damper for washing machines, due to the characteristics of frictional phenomenon, the vibration force F to be transmitted to the base 2a of the washing machine takes the form of rectangular waveforms as shown in FIGS. 3 and 4. Further, the vibration force F to be transmitted to the base 2a has a frequency characteristic causing a peak at all frequencies corresponding to harmonics of driving frequencies. This increases a possibility of generation of resonance with other peripheral structures including the base 2a and the like, resulting in adverse effects to the vibration/noise of the washing machines.

That is, as shown in FIG. 3, even in a normal state wherein the motor 8 is rotated at a constant speed during the dehydrating cycle, the tub 6 vibrates within a relatively small vibration width. In an inordinate state wherein the motor 8 is rotated at excessively accelerated or reduced speed during the dehydrating cycle, as shown in FIG. 4, the vibration width of the tub 6 becomes relatively large. As can be seen from the above description, there is a problem in that it is impossible to effectively attenuate the vibration of the tub 6 in such an inordinate state, even including the normal state, during the dehydrating cycle.

SUMMARY OF THE INVENTION

Therefore, the present invention has been made in view of the above problems, and it is an object of the present invention to provide a damper for washing machines, which enables the degree of a damping force caused thereby to be varied according to the vibration degrees of a tub, thereby more effectively attenuating the vibration of the tub.

In accordance with the present invention, the above and other objects can be accomplished by the provision of a damper for washing machines comprising: a cylinder and a piston interactively coupled to each other in a state wherein the cylinder is connected to a tub and the piston is connected to a base; a first friction member provided around the piston for generating a frictional force when the piston moves inside the cylinder; a slider coupled to the piston inside the cylinder so as to move together with the piston if the piston moves beyond a predetermined displacement range; and a second friction member provided around the slider for generating a frictional force when the slider moves inside the cylinder.

Preferably, the slider may include a slider body inserted inside the piston so as to linearly move, and a mounting portion provided at one end of the slider body, around which the second friction member is mounted.

Preferably, the damper may further comprise interlocking means provided at both the slider and the piston for allowing the slider to move together with the piston if the piston moves beyond the predetermined displacement range.

Preferably, the piston may include a mounting portion at one end thereof to be inserted into the cylinder, around which the first friction member is mounted, and the interlocking means may be formed to cause the second friction member mounting portion of the slider to come into contact with the first friction member mounting portion of the piston as the slider is inserted into the piston.

Preferably, the interlocking means may include protruding means formed at one of the slider and the piston, and capturing means formed at the other one of the slider and the piston so as to capture the protruding means as the slider is extracted from the piston.

Preferably, the protruding means may be defined by protrusions extending outwardly from the slider, and the capturing means may be defined by elongated openings axially formed at the piston for capturing the protrusions therein, respectively.

Preferably, the protruding means may be defined by a pin penetrating through the piston and fixed thereby, and the capturing means may be defined by elongated openings axially formed at the slider for capturing the pin.

Preferably, the slider may further include slits formed along a longitudinal direction of the slider body for allowing the slider body to be easily inserted into and assembled inside the piston.

Preferably, the damper may further comprise damping means provided at the piston and the slider for absorbing a shock caused between the piston and the slider.

Preferably, the piston may include a mounting portion formed at one end thereof to be inserted into the cylinder, around which the first friction member is mounted, and the damping means may be provided on at least one of facing surfaces of the first friction member mounting portion of the piston and the second friction member mounting portion of the slider.

Preferably, the damping means may be a spring for supporting the other end of the slider inside the piston.

Preferably, the damping means may be an air chamber defining a sealed structure between facing ends of the slider and the piston.

Preferably, the piston may include a guide rod, around which the slider is mounted so as to move relatively within a predetermined range, and stoppers provided at both ends of the guide rod for restricting the relative movement range of the slider.

Preferably, the slider may have a cylindrical structure and may be mounted around the guide rod, the second friction member being mounted around an outer peripheral surface of the slider.

Preferably, at least one of the stoppers may be mounted with the first friction member.

Preferably, the damper may further comprise damping means provided at contact surfaces between the stoppers and the slider.

Preferably, the damping means may include magnets installed so that those with the same polarity face each other, or coil springs provided between the stoppers and the slider for providing an elastic force.

As stated above, the damper for washing machines in accordance with the present invention is operated in such a manner that, in a normal state wherein the vibration of a tub is relatively small, it achieves a damping action only by means of a first friction ring provided at a piston thereof, but, in an inordinate state wherein the vibration of the tub is relatively large, it achieves a damping action by means of both a second friction ring provided at a slider as well as the first friction ring of the piston. In this way, since a resulting damping force caused by the damper is variable according to the vibration degrees of the tub, it is possible to effectively attenuate the vibration of the tub.

Further, according to the present invention, the damper comprises various damping means, such as a coil spring, air spring, magnet, or the like, between the slider and piston, so as to absorb a shock caused between the slider and the piston, thereby preventing damage to respective components as well as preventing the periodic generation of noise.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the accompanying drawings.

In the drawings illustrating various embodiments of a damper for washing machines, the same or similar elements are denoted by the same reference numerals even though they are depicted in different drawings, and a detailed description thereof will be omitted when it may make the subject matter of the present invention rather unclear. In relation to the configuration of a washing machine, especially, not shown elements and portions thereof will be explained with reference to FIG. 1.

The damper for washing machines in accordance with the present invention is installed between a tub 6, in which washing water is loaded for washing the laundry, and a base 2a formed as the bottom portion of a cabinet 2 defining the external appearance of the washing machine. With this installation, the damper serves to support the tub 6, and to attenuate the vibration of the tub 6 in a normal state as well as inordinate state. Various embodiments of such a damper for washing machines will be explained in detail.

Figure 5:
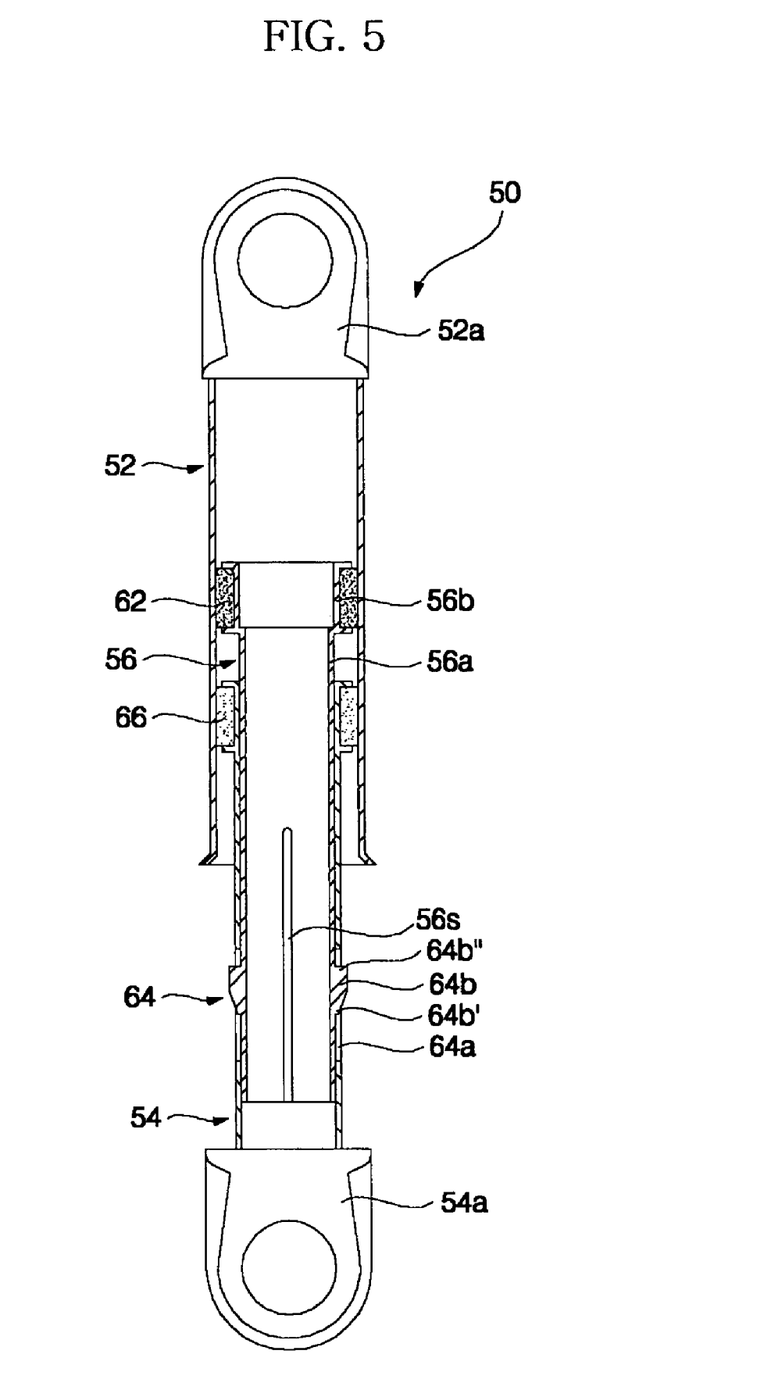
FIGS. 5 and 6 are longitudinal sectional views, respectively, illustrating an assembled state and an exploded state of a damper for washing machines in accordance with a first preferred embodiment of the present invention.
Figure 6:
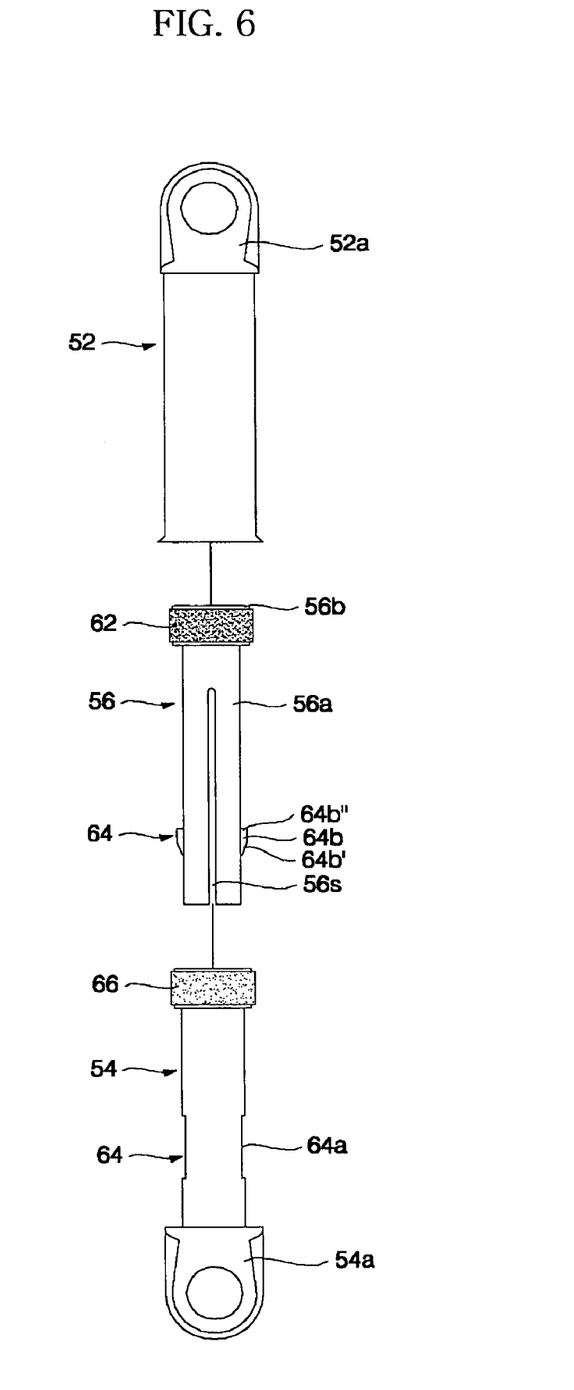

FIGS. 5 and 6 are longitudinal sectional views, respectively, illustrating an assembled state and an exploded state of a damper for washing machines in accordance with a first embodiment of the present invention.

As shown in FIGS. 5 and 6, the damper for washing machines in accordance with the first embodiment of the present invention, designated as reference numeral 50, comprises a cylinder 52, a piston 54, a first friction ring 66, a slider 56, a second friction ring 62, and an interlocking device 64. The cylinder 52 is connected to the tub 6 by means of a hinge, and a piston 54 is movably inserted inside the cylinder 52 in a state wherein it is connected to the base 2a by means of a hinge. The first friction ring 66 is provided around the piston 54, and is adapted to allow the piston 54 to frictionally move inside the cylinder 52. The slider 56 is extended into the piston 54 and coupled thereto within the cylinder 52 so that it linearly moves along with the piston 54 if the piston 54 moves beyond a predetermined displacement range. The second friction ring 62 is provided around the slider 56 and is adapted to allow the slider 56 to frictionally move inside the cylinder 52. At the slider 56 and the piston 54 is provided the interlocking device 64 for allowing the slider 56 to frictionally move inside the piston 54 within a predetermined range.

The cylinder 52 has a cylindrical shape, and is formed at the upper end thereof with a connection portion 52a so that it is connected to a cylinder fixing end 11a formed at the tub 6 by means of the hinge. The lower end of the cylinder 52 is shaped to have an open structure for allowing the insertion of the piston 54 and the slider 56.

Similarly to the cylinder 52, the piston 54 is shaped at the upper end thereof to have an open structure for allowing the insertion of the slider 56, and is formed at the lower end thereof with a connection portion 54a so that it is connected to a piston fixing end 11b formed at the base 2a of the washing machine by means of the hinge.

The first friction ring 66 is made of a material, such as sponge and the like, generating a smaller damping force than that of the second friction ring 62. The first friction ring 66 is fixed around the upper end region of the piston 54 and comes into close contact with the inner peripheral surface of the cylinder 52. With this installation, the first friction ring 66 serves to generate a frictional force as the piston 54 moves inside the cylinder 52.

The slider 56 comprises a cylindrical slider body 56a, and a mounting portion 56b. The cylindrical slider body 56a has an outer diameter smaller than an inner diameter of the piston 54 so that it is smoothly inserted into the piston 54. The mounting portion 56b is a portion radially protruding from the upper end region of the slider body 56a so as to define a space for use in the mounting of the second friction ring 62. The mounting portion 56b of the slider 56 has an outer diameter smaller than an inner diameter of the cylinder 52.

The second friction ring 62 is made of a material, such as sponge and the like, capable of generating a frictional force. The second friction ring 62 is fitted inside the space defined by the mounting portion 56b of the slider 56 so that it comes into close contact with the inner peripheral surface of the cylinder 52. Therefore, the second friction ring 62 serves to generate a frictional force as the piston 54 moves inside the cylinder 52.

Here, the frictional force generated by the second friction ring 62 is larger than the frictional force generated by the first friction ring 66. Therefore, in a normal state wherein the vibration of the tub 6 is relatively small, the vibration of the tub 6 is simply attenuated as the piston 54 frictionally moves inside the cylinder 52 within the predetermined displacement range by interposing the first friction ring 66. Even in an inordinate state wherein the vibration of the tub 6 is relatively large, the vibration of the tub 6 is effectively attenuated as the slider 56 frictionally moves inside the cylinder 52 by interposing the second friction ring 62, in addition to the frictional movement of the piston 54.

The interlocking device 64 comprises a pair of elongated guide openings 64a axially formed at opposite sides of the piston 54 for defining capturing portions, and a pair of guide protrusions 64b protruding from the lower end region of the slider body 56a so that they penetrate through the guide openings 64a and axially move along the guide openings 64a, respectively.

The slider body 56a is formed with a pair of vertical slits 56s extending from the middle portion to the lower end thereof. These slits 56s serve to allow the slider body 56a to be compressively inserted into the piston 54. By virtue of these slits 56s, even if the slider body 56a is formed with the guide protrusions 64b, the slider body 56a is easily inserted into and assembled inside the piston 54, and the guide protrusions 64b are easily fitted through the guide openings 64a, respectively.

Considering each of the guide protrusions 64b in detail, it has a smoothly inclined lower portion 64b', and a stepped upper portion 64b". The smoothly inclined lower portion 64b' of the respective guide protrusion 64b serves to secure more easy insertion of the slider body 56a into the piston 54 and, consequently, more easy fitting of the guide protrusion 64b through the guide opening 64a. The stepped upper portion 64b" of the respective guide protrusion 64b serves to prevent the guide protrusion 64b from being removed from the guide opening 64a after the slider body 56a is assembled into the piston 54

Although the interlocking device 64 is formed in such a manner that the guide openings 64a are formed at the piston 54 and the guide protrusions 64b are formed at the slider body 56a, it is acceptable that the guide protrusions 64b are formed at the piston 54, and the guide openings 64a are formed at the slider body 56a.

The operation of the damper for washing machines in accordance with the first embodiment of the present invention will be explained.

As the motor 8 is operated in a state wherein the drum 7 accommodates the laundry, the drum 7 performs washing and rinsing cycles according to the rotation thereof. After completion of the washing and rinsing cycles, the drum 7 further rotates at a higher speed, thereby performing a dehydrating cycle in such a manner that washing water is removed from the laundry by virtue of a centrifugal force.

In this case, the drum 7 vibrates to some extents according to the rotation thereof, and such a vibration of the drum 7 is transmitted toward the tub 6. Since the tub 6 is supported by means of the spring 4 and the damper 50 as stated above, however, the tub 6 operates to attenuate the transmission of the vibration toward the cabinet 2.

In a normal state wherein the rotating speed of the motor 8 is constant and thus the vibration of the tub 6 is relatively small, the piston 54 moves relative to both the cylinder 52 and the slider 56. That is, the cylinder 52 and slider 56 move together by the second friction ring 62 interposed therebetween, while the piston 54 frictionally moves inside the cylinder 52 by the first friction ring 66 interposed therebetween, resulting in an attenuation in the vibration of the tub 6.

Differently, in an inordinate state wherein the rotating speed of the motor 8 is excessively accelerated or reduced and thus the vibration of the tub 6 is relatively large, the slider 56, in addition to the piston 54, moves relative to the cylinder 52. That is, the piston 54 frictionally moves inside the cylinder 52 by the first friction ring 66 interposed therebetween, and if the piston 54 moves beyond the predetermined displacement range, the slider 56 also frictionally moves inside the cylinder 52 by the second friction ring 62 interposed therebetween while moving along with the piston 54 by the interlocking device 64, resulting in generation of a frictional force. Therefore, as the first and second friction rings 66 and 62 simultaneously and frictionally move inside the cylinder 52, the vibration of the tub 6 is attenuated.

Here, the slider 56 and the piston 54 restrictively move relative to each other within the predetermined displacement range. That is, the slider 56 and piston 54 can move relative to each other only while the guide protrusions 64b move along the guide openings 64a. If the movement of the guide protrusions 64b is stopped as they collide against the edges of the guide openings 64a, the slider 56 moves together with the piston 54, thereby serving to attenuate vibration.

Figure 7:
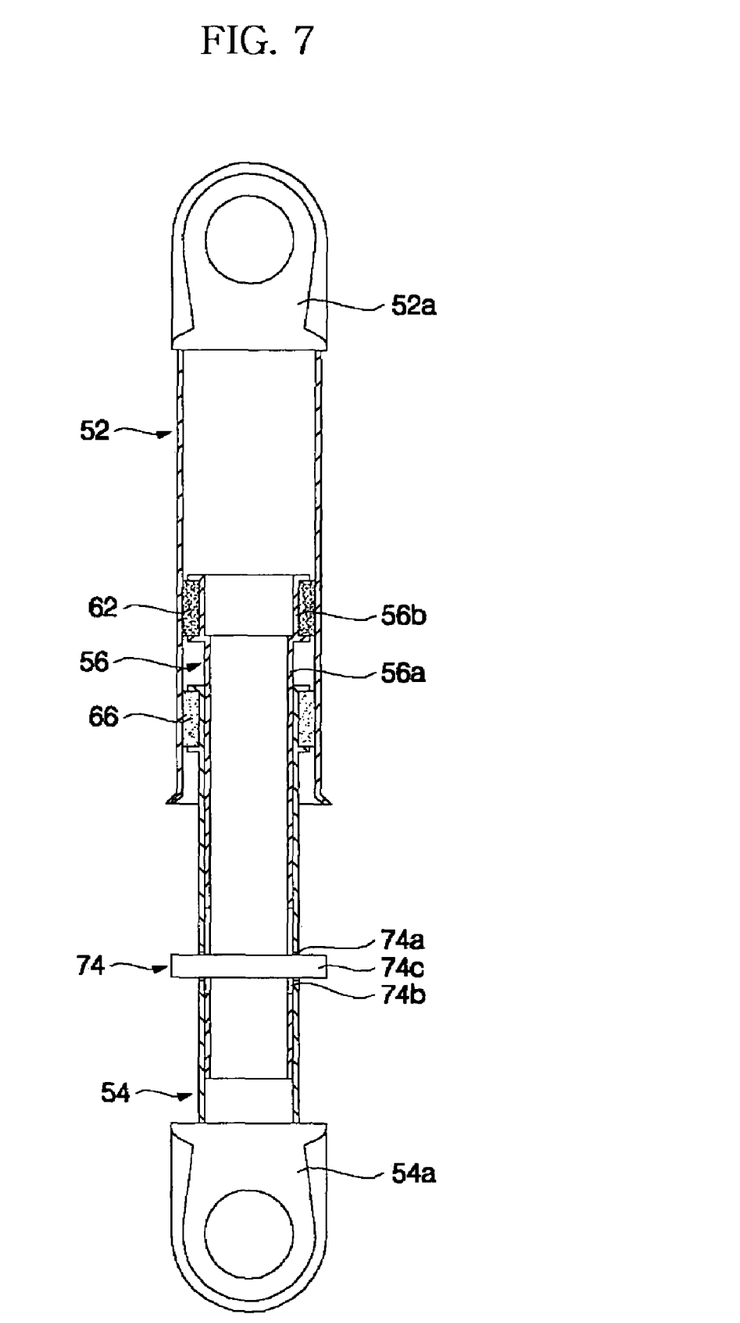
FIGS. 7 and 8 are longitudinal sectional views, respectively, illustrating an assembled state and an exploded state of a damper for washing machines in accordance with a second preferred embodiment of the present invention.
Figure 8:
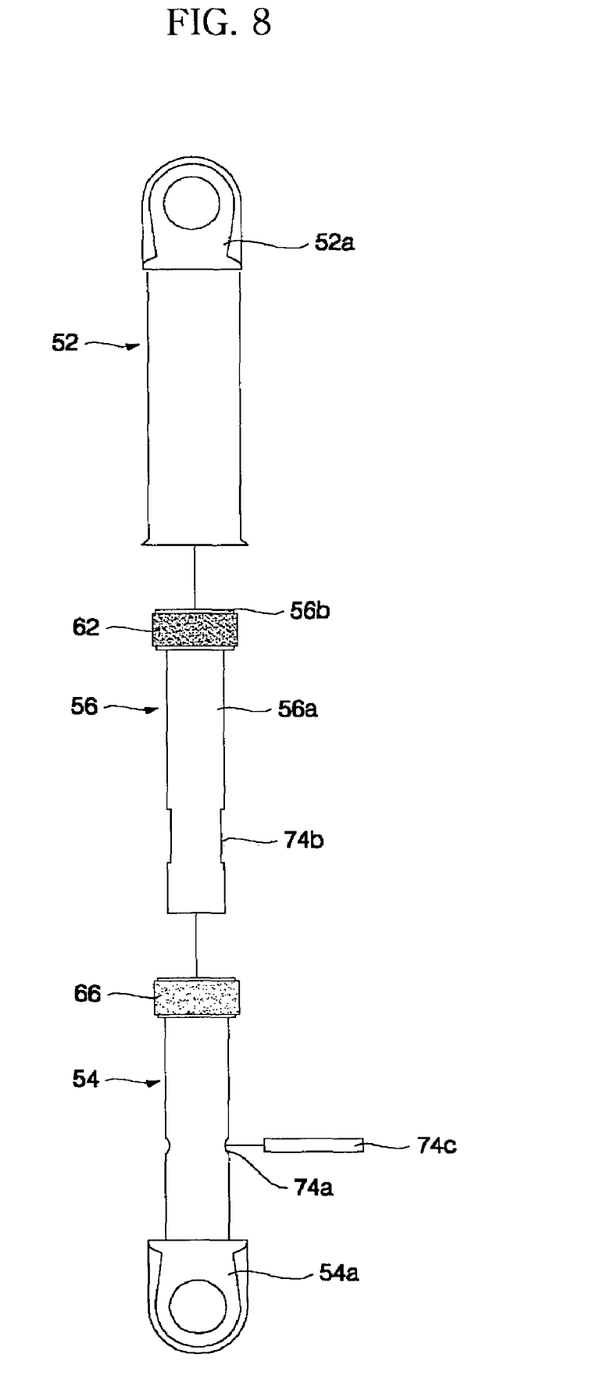

FIGS. 7 and 8 are longitudinal sectional views, respectively, illustrating an assembled state and an exploded state of a damper for washing machines in accordance with a second embodiment of the present invention.

As shown in FIGS. 7 and 8, the damper for washing machines according to the second embodiment of the present invention is configured similarly to the configuration of the first embodiment, except that the interlocking device 64 being replaced by an interlocking device 74.

The interlocking device 74 is provided between the slider 56 and the piston 54, and is adapted to allow the slider 56 to move along with the piston 54 if the piston 54 moves beyond a predetermined displacement range.

The interlocking device 74 comprises a pair of fixing holes 74a formed at the piston 54, a pair of elongated guide openings 74b axially formed at the slider 56, and a fixing pin 74c fitted and fixed through the fixing holes 74a and the guide openings 74b.

With this interlocking device 74, in a normal state wherein the vibration of the tub 6 is relatively small, the piston 54 and fixing pin 74c linearly move within the length range of the guide openings 74b. If the vibration of the tub 6 becomes relatively large, however, the piston 54 and slider 56 move together as the fixing pin 74c penetrating through the piston 54 collides with the edges of the guide openings 74b. During the integral movement of the piston 54 and the slider 56, the vibration of the tub 6 is attenuated by virtue of the frictional forces generated by both the first and second friction rings 66 and 62.

Alternatively, the interlocking device 74 may be configured in such a manner that the elongated guide openings 74b are axially formed at the piston 54, and the fixing pin 74c is installed so as to penetrate the slider body 56a.

Figure 9:
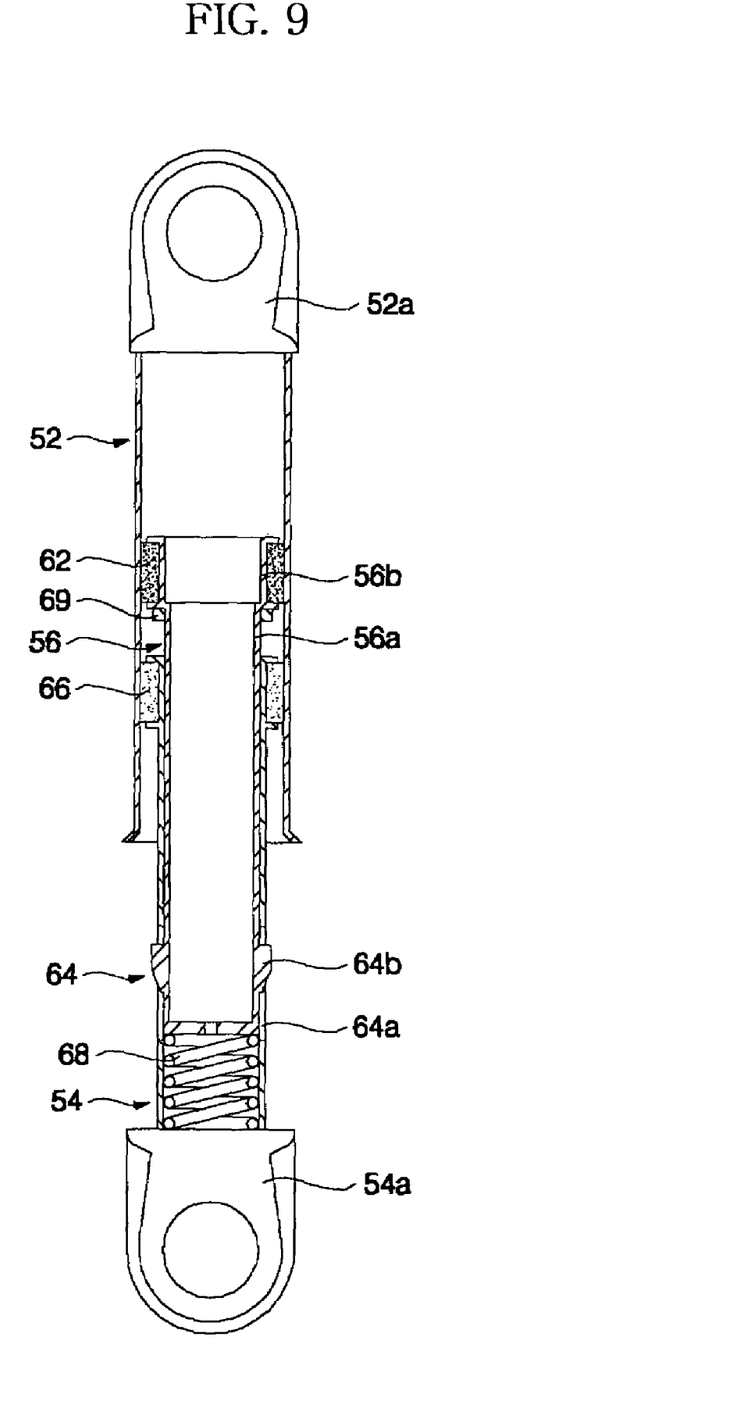
FIG. 9 is a longitudinal sectional view illustrating a damper for washing machines in accordance with a third embodiment of the present invention.

FIG. 9 is a longitudinal sectional view illustrating a damper for washing machines in accordance with a third embodiment of the present invention.

As shown in FIG. 9, the damper for washing machines according to the third embodiment of the present invention is configured similarly to the configuration of the first embodiment, except that it further comprises a first damping means installed at the lower ends of the slider 56 and the piston 54 for absorbing a shock caused between the slider 56 and the piston 54, and a second damping means installed at the upper ends of the slider 56 and piston 54 for absorbing a shock caused between the slider 56 and the piston 54.

The first damping means is defined by a coil spring 68, which is supported inside the lower portion of the piston 54, and is adapted to support the lower end of the slider body 56a in an axial direction. In this case, the slider body 56a and the piston 54 are configured to have blind lower end structures for supporting the coil spring 68, or are formed with spring seats, respectively.

The second damping means is defined by an elastic member 69, which is made of a rubber material. The elastic member 69 is fixed around the slider body 56a so that it comes into contact with the upper end of the piston 54 at the lower side of the mounting portion 56b of the slider 56.

By virtue of the coil spring 68 and the elastic member 69 installed between the slider 56 and the piston 54, when excessive relative movements are generated between the slider 56 and the piston 54 in an inordinate state wherein the vibration of the tub 6 is relatively large, such relative movements are absorbed by the coil spring 68, resulting in prevention of the guide protrusions 64b from being damaged as they collide with the edges of the guide openings 64a. Further, the relative movements are absorbed by the elastic member 69, resulting in prevention of the mounting portion 56b of the slider 56 from being damaged as it collides with the upper end of the piston 54.

Figure 10:
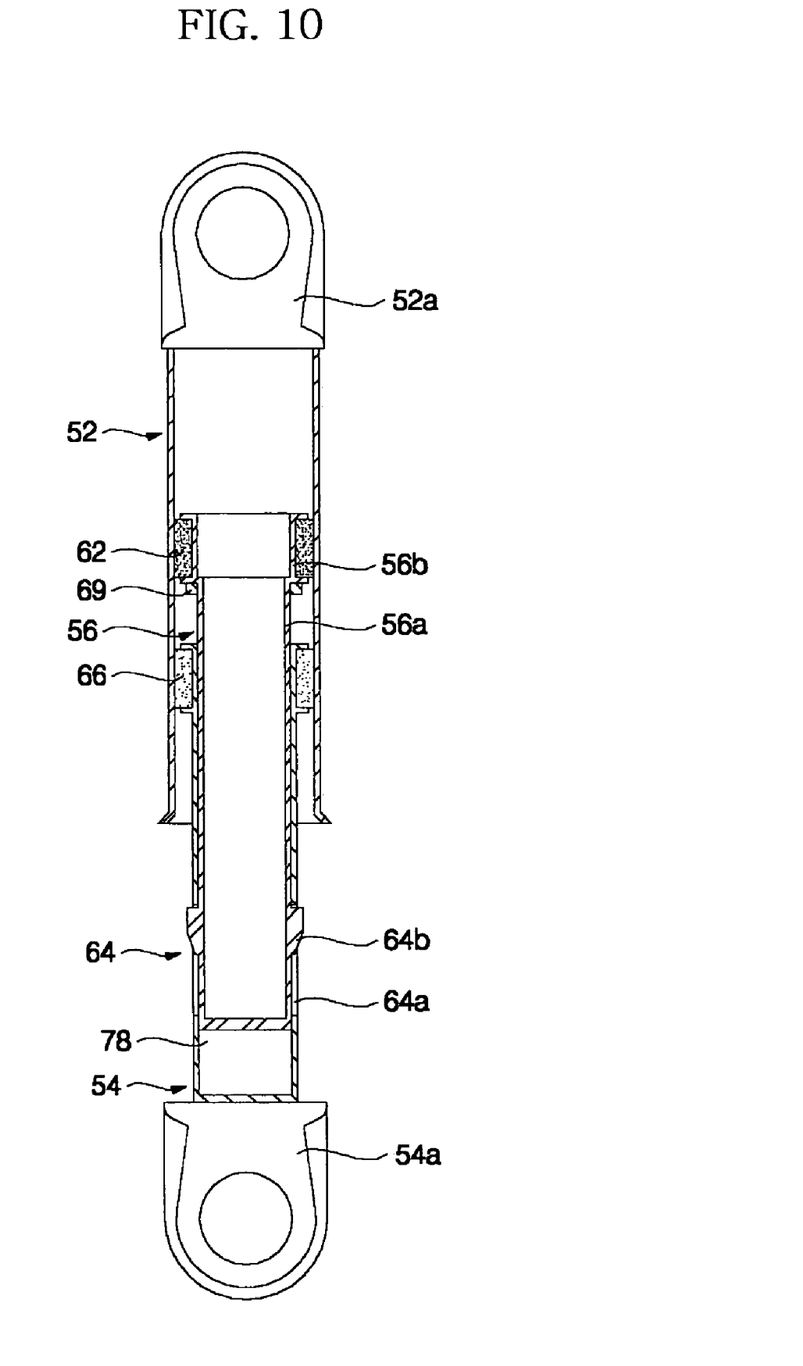
FIG. 10 is a longitudinal sectional view illustrating a damper for washing machines in accordance with a fourth embodiment of the present invention.

FIG. 10 is a longitudinal sectional view illustrating a damper for washing machines in accordance with a fourth embodiment of the present invention.

As shown in FIG. 10, the damper for washing machines according to the fourth embodiment of the present invention is configured similarly to the configuration of the third embodiment, except that the first damping means, provided at the lower sides of the slider 56 and the piston 54, is defined by an air chamber 78 acting like an air spring. The air chamber 78 is formed by injecting air into a sealed space defined between facing ends of the slider body 56a and the piston 54.

Here, the slider body 56a is shaped to have a blind lower end structure. The positions of the guide openings 64a and the guide protrusions 64b are determined so that there is formed such a sealed space between the facing ends of the slider body 56a and the piston 54 even if the slider 56 is at the maximum distance from the piston 54.

Figure 11:
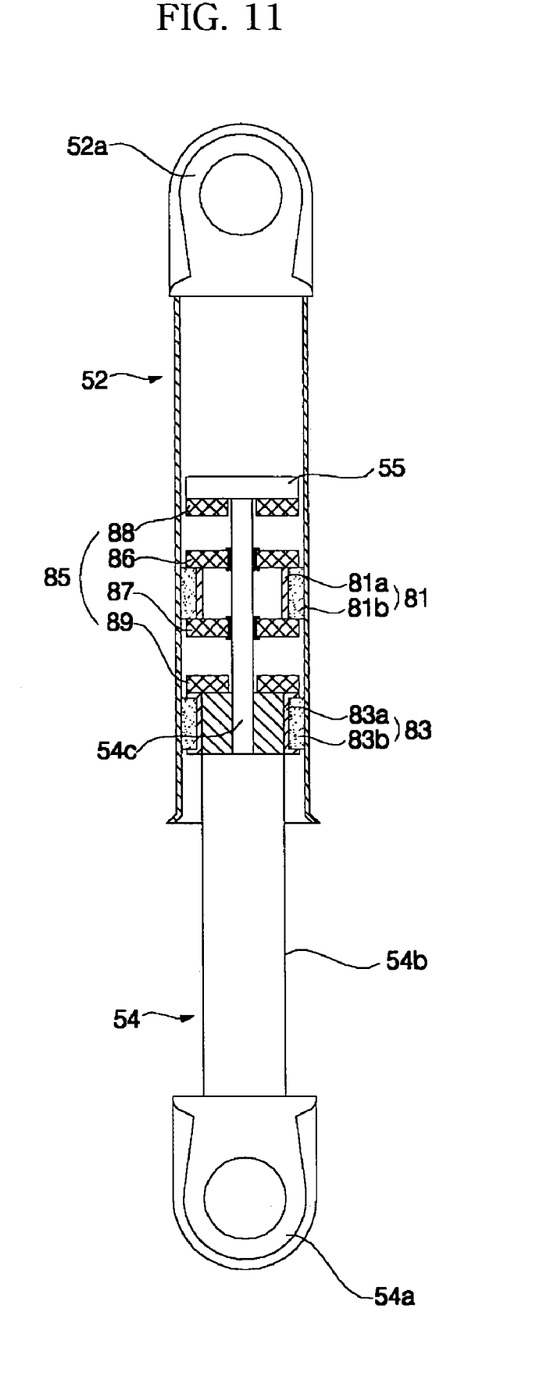
FIG. 11 is a longitudinal sectional view illustrating a damper for washing machines in accordance with a fifth embodiment of the present invention.

FIG. 11 is a longitudinal sectional view illustrating a damper for washing machines in accordance with a fifth embodiment of the present invention.

As shown in FIG. 11, the damper for washing machines in accordance with the fifth embodiment of the present invention comprises the cylinder 52, the piston 54, a slider 81 mounted therearound with a second friction ring 81b, a friction stopper 83 mounted therearound with a first friction ring 83b, and a damping device 85. The piston 54 has a piston rod 54b, which extends out of the cylinder 52. The cylinder 52 is provided at the outer upper end thereof with the connection portion 52a, while the piston rod 54b is provided at the outer lower end thereof with the connection portion 54a.

The slider 81 and the friction stopper 83 are preferably configured in such a manner that their ring bodies 81a and 83a are made of a metal material, resin material, or the like, and their second and first friction rings 81b and 83b capable of generating a frictional force are mounted around the outer peripheral surfaces of the ring bodies 81a and 83b, respectively, but it is acceptable that the ring bodies 81a and 83b are made of any frictional materials.

The slider 81 is movably coupled to the piston rod 54b so as to move relative to the piston rod 54b, while the friction stopper 83 is fixed to the piston rod 54b so as to move along with the piston rod 54b. Therefore, relative movements between the friction stopper 83 and the piston rod 54a are prevented.

The piston 54 further has a guide rod 54c, which is located and fixed inside the cylinder 52, along with the friction stopper 83. At the upper end of the guide rod 54c is fixed a tip end stopper 55. Between the tip end stopper 55 and the friction stopper 83 is coupled the slider 81 in an axially slidable manner. The second friction ring 81b of the slider 81 generates a frictional force larger than that of the first friction ring 83b of the friction stopper 83. At both sides of the slider 81 are coupled certain components constituting the damping device 85.

The damping device 85 comprises a pair of upper and lower magnets 86 and 87 disposed on the basis of the slider 81. The upper and lower magnets 86 and 87 are coupled onto the upper and lower surfaces of the slider 81, respectively, so as to move along with the slider 81. The damping device 85 further comprises a pair of magnets 88 and 89, which are coupled to the inner side surface of the tip end stopper 55 and the inner side surface of the friction stopper 83, respectively.

Figure 12:
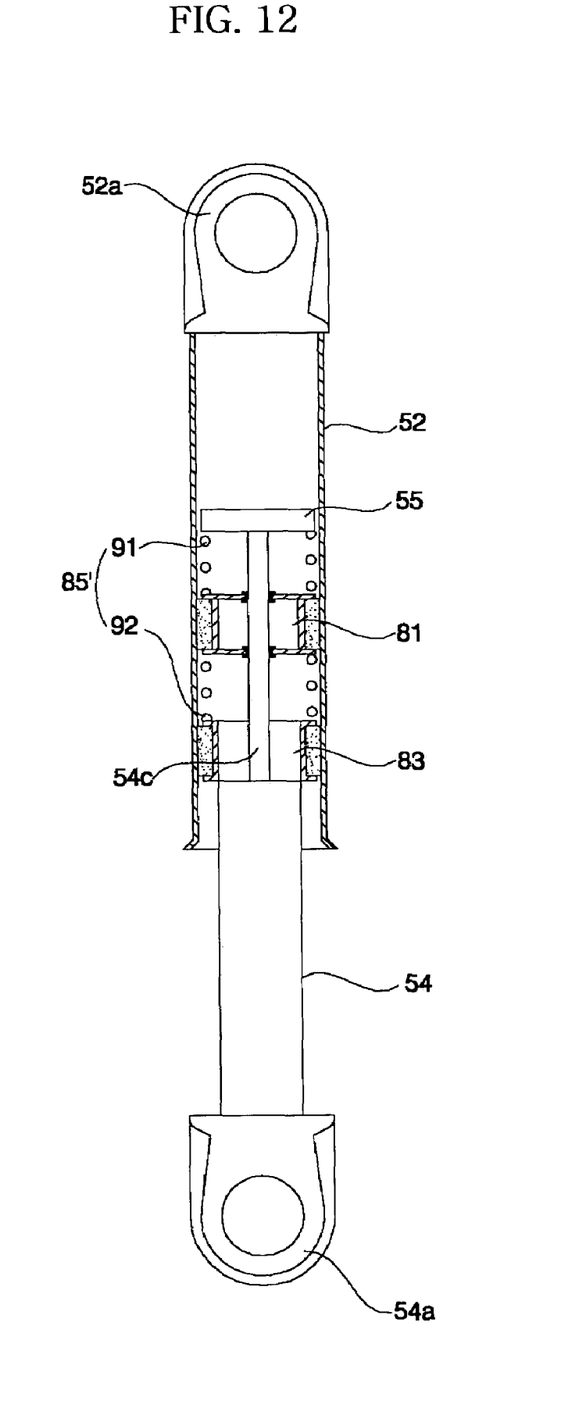
FIG. 12 is a longitudinal sectional view illustrating a damper for washing machines in accordance with a sixth embodiment of the present invention.

FIG. 12 is a longitudinal sectional view illustrating a damper for washing machines in accordance with a sixth embodiment of the present invention.

As shown in FIG. 12, the damper for washing machines according to the sixth embodiment of the present invention comprises a damping device 85' consisting of upper and lower coil springs 91 and 92. The upper coil spring 91 is provided between the tip end stopper 55 and the slider 81, and the lower coil spring 92 is provided between the slider 81 and the friction stopper 83.

The operation of the damper will be explained with reference to the fifth and sixth embodiments of the present invention.

During the washing and dehydrating cycles, the cylinder 52 of the damper moves according to the movement of the tub 6 of the washing machine. Supposing the displacement of the cylinder 52 as X1, if the displacement X1 is smaller than a distance A between the movable magnets 86 and 87, which are installed to move relative to the piston rod 54b, and the fixed magnets 88 and 89, which are fixed to the piston rod 54, the cylinder 52 and the slider 81 move together since the frictional force of the second friction ring 81b provided around the slider 81 is larger than that of the first friction ring 83b provided around the friction stopper 83. In this case, the force to be transmitted toward the base 2a of the washing machine is the total amount of a frictional force F2 generated by the friction stopper 83 and a repulsive force RM generated by the damping device 85.

If the displacement X1 is larger than the distance A, that is, after the slider 81 comes into contact with the friction stopper 83, the total force of the frictional forces F1 and F2 is transmitted to the base 2a.

According to such a behavior, the transmitted force corresponding to the displacement X1 will be expressed as follows:

$X1 = A*\sin(\omega t)$ $dX1 = A\omega*\cos(\omega t)$ $F = RM(X1) + B\text{sgn}(dX1), (X1 < \text{gap})$ $F = (A+B)\text{sgn}(dX1), (X1 \geq \text{gap})$ wherein,
X1: displacement of the cylinder
dX1: speed of the cylinder
ω: a rotation frequency during dehydrating/washing cycles
RM: a repulsive force by the damping device
A: a high damping factor of the second friction ring
B: a low damping factor of the first friction ring
Function Sgn(X) has a value of 1 if X is positive, and has a value of 0 if X is negative.

As apparent from the above description, the present invention provides a damper for washing machines, which is operated in such a manner that, in a normal state wherein the vibration of a tub is relatively small, it achieves a damping action only by means of a first friction ring provided at a piston thereof, but, in an inordinate state wherein the vibration of the tub is relatively large, it achieves a damping action by means of both a second friction ring provided at a slider thereof as well as the first friction ring of the piston. With this operation of the damper, a resulting damping force caused by the damper is variable according to the vibration degrees of the tub, thus it is possible to effectively attenuate the vibration of the tub.

Further, according to the present invention, the damper comprises various damping means, such as a coil spring, air spring, magnet, or the like, between the slider and piston, so as to absorb a shock caused between the slider and the piston, thereby preventing damage to respective components as well as preventing the periodic generation of noise.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A damper for a washing machine, comprising:
   a cylinder and a piston interactively coupled to each other in a state wherein the cylinder is connected to a tub and the piston is connected to a base;
   a first friction member fixed around the piston to frictionally move in direct contact with an inner peripheral surface of the cylinder for generating a frictional force when the piston moves inside the cylinder;
   a slider coupled inside the piston inside the cylinder so as to move together with the piston if the piston moves beyond a predetermined displacement range; and
   a second friction member fixed around the slider to frictionally move in direct contact with an inner peripheral surface of the cylinder for generating a frictional force when the slider moves inside the cylinder.

2. The damper as set forth in claim 1, wherein the slider includes:
   a slider body inserted inside the piston so as to linearly move; and
   a mounting portion provided at one end of the slider body, around which the second friction member is mounted.

3. The damper as set forth in claim 2, further comprising:
   interlocking means provided at both the slider and the piston for allowing the slider to move together with the piston if the piston moves beyond the predetermined displacement range.

4. The damper as set forth in claim 3, wherein the piston includes a mounting portion at one end thereof to be inserted into the cylinder, around which the first friction member is mounted; and
   wherein the interlocking means is formed to cause the second friction member mounting portion of the slider to come into contact with the first friction member mounting portion of the piston as the slider is inserted into the piston.

5. The damper as set forth in claim 3, wherein the interlocking means includes:
protruding means formed at one of the slider and the piston; and
capturing means formed at the other one of the slider and the piston so as to capture the protruding means as the slider is extracted from the piston.

6. The damper as set forth in claim 5, wherein the protruding means is defined by protrusions extending outwardly from the slider; and
wherein the capturing means is defined by elongated openings axially formed at the piston for capturing the protrusions therein, respectively.

7. The damper as set forth in claim 6, wherein the slider further includes slits formed along a longitudinal direction of the slider body for allowing the slider body to be easily inserted into and assembled inside the piston.

8. The damper as set forth in claim 5, wherein the protruding means is defined by a pin penetrating through the piston and fixed thereby; and
wherein the capturing means is defined by elongated openings axially formed at the slider for capturing the pin.

9. The damper as set forth in claim 2, further comprising:
damping means provided at the piston and the slider for absorbing a shock caused between the piston and the slider.

10. The damper as set forth in claim 9, wherein the piston includes a mounting portion formed at one end thereof to be inserted into the cylinder, around which the first friction member is mounted; and
wherein the damping means is provided on at least one of facing surfaces of the first friction member mounting portion of the piston and the second friction member mounting portion of the slider.

11. The damper as set forth in claim 9, wherein the damping means is a spring for supporting the other end of the slider inside the piston.

12. The damper as set forth in claim 9, wherein the damping means is an air chamber defining a sealed structure between facing ends of the slider and the piston.

13. The damper as set forth in claim 1, wherein the piston includes:
a guide rod, around which the slider is mounted so as to move relatively within a predetermined range; and
stoppers provided at both ends of the guide rod for restricting the relative movement range of the slider.

14. The damper as set forth in claim 13, wherein the slider has a cylindrical structure and is mounted around the guide rod, the second friction member being mounted around an outer peripheral surface of the slider.

15. The damper as set forth in claim 13, wherein at least one of the stoppers is mounted with the first friction member.

16. The damper as set forth in claim 13, further comprising:
damping means provided at contact surfaces between the stoppers and the slider.

17. The damper as set forth in claim 16, wherein the damping means includes magnets installed so that those with the same polarity face each other.

18. The damper as set forth in claim 16, wherein the damping means includes coil springs provided between the stoppers and the slider for providing an elastic force.

19. A damper for a washing machine, comprising:
a cylinder connected to one of a tub and a base;
a piston interactively coupled to the other one of the tub and the base not connected with the cylinder;
a first friction member provided around the piston so as to frictionally move in direct contact with an inner peripheral surface of the cylinder for generating a frictional force;
a slider inserted into the piston inside the cylinder so as to move relatively;
a second friction member provided around the slider so as to frictionally move in direct contact with the inner peripheral surface of the cylinder for generating a frictional force; and
interlocking means provided at both the piston and the slider for allowing the slider to move together with the piston if the piston moves beyond a predetermined displacement range.

20. A damper for a washing machine, comprising:
a cylinder and a piston interactively coupled to each other in a state wherein the cylinder is connected to a tub and the piston is connected to a base;
a first friction member fixed around the piston to frictionally move in direct contact with an inner peripheral surface of the cylinder for generating a frictional force when the piston moves inside the cylinder;
a slider coupled inside the piston inside the cylinder so as to move together with the piston if the piston moves beyond a predetermined displacement range and to move with the cylinder when the piston is located in the predetermined distance range; and
a second friction member fixed around the slider to frictionally move in direct contact with an inner peripheral surface of the cylinder for generating a frictional force when the slider moves inside the cylinder.

* * * * *